United States Patent
Ison et al.

(10) Patent No.: US 7,195,160 B2
(45) Date of Patent: Mar. 27, 2007

(54) MINI CARD READER SYSTEMS AND METHODS

(75) Inventors: Eric Ison, Virginia Beach, VA (US); Robert L. Caillier, Moyock, NC (US)

(73) Assignee: First Data Corporation, Greenwood Village, CO (US)

( * ) Notice: Subject to any disclaimer, the term of this patent is extended or adjusted under 35 U.S.C. 154(b) by 331 days.

(21) Appl. No.: 10/927,396

(22) Filed: Aug. 25, 2004

(65) Prior Publication Data

US 2006/0043180 A1    Mar. 2, 2006

(51) Int. Cl.
*G06K 7/06* (2006.01)

(52) U.S. Cl. .................................. 235/442; 235/445

(58) Field of Classification Search ............. 235/442, 235/445, 458, 449, 440, 446, 493
See application file for complete search history.

(56) References Cited

U.S. PATENT DOCUMENTS

| | | | |
|---|---|---|---|
| 4,075,460 A | * | 2/1978 | Gorgens ..................... 235/420 |
| 5,559,315 A | | 9/1996 | Nair et al. |
| 6,294,032 B1 | | 9/2001 | Weinmann et al. |
| 6,991,163 B2 | * | 1/2006 | Akabane et al. ............ 235/449 |

* cited by examiner

*Primary Examiner*—Lisa M. Caputo
(74) *Attorney, Agent, or Firm*—Townsend and Townsend and Crew LLP (57) ABSTRACT

A card reader system includes a sensor to sense the presence of a scoring of a card at a specified card location. A read head is employed to read a magnetic stripe disposed on the card. Also, a circuit is coupled to both a sensor and the read head. The circuit is configured to receive input from the sensor, to determine whether the card is a first size or a second size based on the received input, and to enable the read head to read the entire magstripe when the card is the first size and to read a portion of the magstripe when the card is the second size.

21 Claims, 5 Drawing Sheets

MINI CARD READER SYSTEMS AND METHODS

BACKGROUND OF THE INVENTION

The present invention is directed generally to card reader systems, and more specifically, to systems and methods for reading cards including miniature cards smaller than standard credit cards.

Card readers currently exist that process credit cards by reading information contained on a magnetic stripe attached to the back of the card. One such system is the BOWE 7710 system, produced by BOWE Systec, having its headquarters in Augsburg, Germany. This system often is coupled with additional devices that allow new credit cards to be organized and attached to mailing inserts. The cards are then mailed to current or potential customers. Cards to date, including credit cards, automated teller machine (ATM) cards, debit cards, and the like, have generally conformed to a standard size referred to as a CR80 card. These CR80 cards are typically about eighty-five millimeters (85 mm) long and about fifty-four millimeters (54 mm) wide.

Recently, some card issuers have begun to provide smaller cards to their customers. In some cases, these miniature or "mini" cards are created from a CR80-sized card. The CR80 cards are scored in a vertical direction to shorten the length of the card, and may also be scored horizontally to shorten the height of the card. The miniature card is formed by breaking off the CR80 card edges formed by the scores. The magnetic stripe on the CR80 card spans the entire width of the card. When creating the miniature card, the discarded pieces also discard a portion of the magnetic stripe. The portion of the magnetic stripe remaining on the miniature card contains desired information, such as account numbers.

Unfortunately, when the card reader system reads the magnetic stripe on the back of a scored card, on some occasions the system read head detects the score. More specifically, for some but not all of the cards, the read back amplitude detected by the read head drops to a non-readable state when they score passes the read head. The card reader system interprets this score as the separation of two distinct cards, with a new card beginning after this score-created amplitude drop. The card reader falsely assumes that two cards exist when only a single, scored card is being read. As a result, the card reader falsely determines that the cards will not be matched with the appropriate customer card carrier, or the like, and an error is flagged. The effect is that the operator of the card reader and card inserter systems must stop the card processing to reinitialize the machine. Hence, considerable processing delays may occur as a result of the false reads caused by the miniature cards. Improvements are desired.

BRIEF SUMMARY OF THE INVENTION

The present invention is directed generally to card reader systems, and more specifically, to systems and methods for reading cards including miniature or "mini" cards smaller than standard credit cards, automated teller machine (ATM) cards, and the like. The present invention provides improved card reader systems and methods of operation.

In one embodiment, a card reader system according to the present invention includes a means for sensing the presence of a scoring of a card at a specified card location. The system includes a read head adapted to read a magnetic stripe (magstripe) disposed on the card, and a circuit coupled to both the means for sensing and the read head. The circuit is adapted to receive input from the sensing means, to determine whether the card is a first size or a second size based on the received input, and to enable the read head to read the entire magstripe when the card is the first size and to read a portion of the magstripe when the card is the second size. In this manner, by providing an improved sensing device with card reader systems, the operation of the read head is controlled so that it is not fooled into believing more cards exist than are truly passing by the read heads. In one embodiment, the first card size is a CR80 card. In other aspects, the second card size is smaller than a CR80 card. Further, the second card size may be a scored CR80 card. The miniature card or smaller card may be created from the scored CR80 card.

In some aspects, the system further includes a second read head that is similarly adapted to read the entire magstripe or a portion of the magstripe when the card is the first size or the second size, respectively. The means for sensing may comprise a variety of sensing devices or apparatuses within the scope of the present invention. In one particular aspect, the means for sensing includes at least two optical sensors. These sensors also may be electronic, mechanical, and the like. In one aspect at least one of the sensors is adapted to sense the scoring of the card. In another aspect, at least one of the sensors is adapted to detect the presence of the card. The scoring itself may comprise a partial or complete scoring of the card. In one aspect the scoring includes a hole through the card at a specified location. In a particular aspect, the hole is formed through an intersection of two or more scores within the card.

In one aspect, the card reader system further includes a switch coupled to the read head. This switch is adapted to turn on the read head when the card is the second size. In one aspect, the switch is positioned so that when the switch is engaged by the card of the second size, a read head reads a portion of the magstripe. The system may further include a relay adapted to disable the switch when the card is the first size. In this manner, the read head reads the entire magstripe when the card is of the first size and reads only a portion of the magstripe when the card is of the second size, based at least in part on the operation of the relay and switch. In one aspect, the switch may be an electronic or mechanical device used to trigger the relay on and off.

The present invention further provides methods for processing one or more cards. In one embodiment, the method includes passing the card past a sensing device with the sensing device adapted to sense a scoring of the card if the card is scored at a specified location. The method includes determining a card size, based at least in part on whether the scoring is sensed, and passing the card past a read head. The read head is activated for the entire passing of the card if the scoring is not sensed. The read head is activated for only a portion of the passing of the card past the read head if the scoring is sensed. In this manner, different sized cards may be sensed, and the read head may be operated accordingly.

In one aspect, the sensing device includes at least first and second sensors with the first sensor adapted to detect the presence of a card and the second sensor adapted to detect the scoring at a specified location. The sensing device may further include a third or additional sensors adapted to detect the presence of the card and/or the scoring. In one aspect, the card engages a switch positioned relative to the read heads so as to turn on the read head after a leading edge of the card has passed the read head. This particular aspect will be useful for reading cards that are smaller than the standard card size, or for reading only a portion of a card. In some aspects, activating the read head causes the read head to read a magnetic stripe on the card.

The method may further include disabling the switch when the scoring is not sensed by the sensing device. In this manner, the switch need not be engaged prior to reading by the read head. As a result, the entire magnetic stripe on the card may be read. In some aspects, the sensing device includes at least one optical sensor. Further, the method may include passing the card past a second read head. The second read head may operate in a similar or different fashion than does the first read head. For example, in one aspect the first read head is manipulated to read either the entire magstripe or a portion of the magstripe depending upon whether the scoring is sensed. The second read head may be a backup read head that reads the entire magstripe. Alternatively, the second read head also reads either the entire magstripe or a portion of the magstripe, depending upon the type of card passing by the read heads.

Other objects, features, and advantages of the present invention will become more fully apparent in the following detailed description, the appended claims, and the accompanying drawings.

DETAILED DESCRIPTION OF THE INVENTION

Figure 1A:
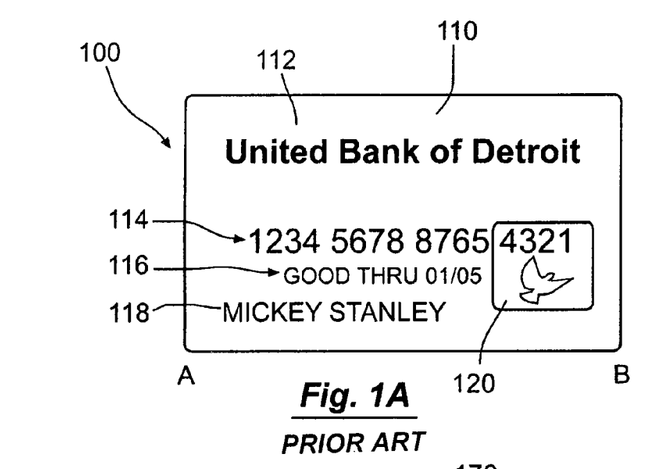
FIGS. 1A and 1B depict the front and back, respectively, of a CR80 card.
Figure 1B:
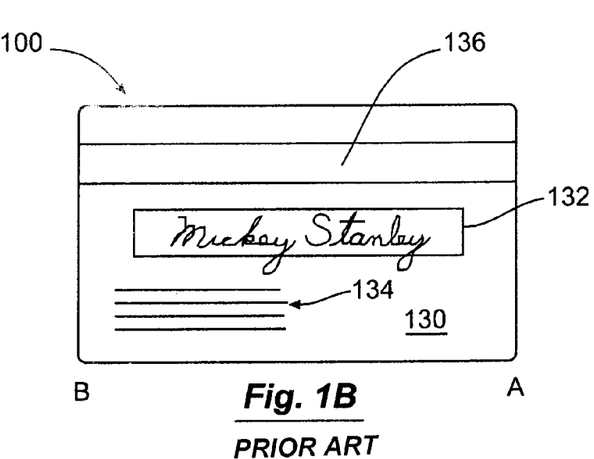

FIGS. 1A and 1B depict a presentation instrument 100 which may be processed through systems of the present invention. In one embodiment, presentation instrument 100 is a CR80 card, or a similar sized card. As noted, in one embodiment card 100 is a CR80 card that is about 85.6 mm in length by about 53.98 mm in height. Card 100 may be a credit card, debit card, Automated Teller Machine (ATM) card, telephone card, stored value card, and a wide range of other transaction-based cards. Card 100 has a first or front surface 110 and a second or back surface 130. First surface 110 may include a name of a bank 112, an account number 114, an expiration date 116, and a customer name 118, among other things. First surface 110 also may have one or more holographic images 120 disposed thereon for, among other things, security protection. Second or back surface 130 includes a signature block 132 for the customer to sign their name. Second surface 130 may further include written or printed text 134, such as contact information for the bank, merchant, or the like who issued card 100. Second surface 130 further includes a magnetic stripe 136. As known to those skilled in the art, magnetic stripe 136 may be magnetized to contain desired information, including a customer account number or the like. Card 100 may be scanned or read using point-of-sale terminals, ATM machines, and a wide range of other devices capable of reading information from magnetic stripe 136.

Cards 100 may be issued by a wide range of parties, including banks, brokerage firms, department stores, clubs, associations, and other institutions. Cards 100 are typically processed in great numbers as they are prepared for mailing to actual or prospective customers. These cards 100 may be processed through machines such as the BOWE 7710 system. The BOWE system passes cards along in series, while reading information containing on the magnetic stripe. The cards are subsequently mated with appropriate materials, inserts, card holders and the like, prior to mailing.

Figure 1C:
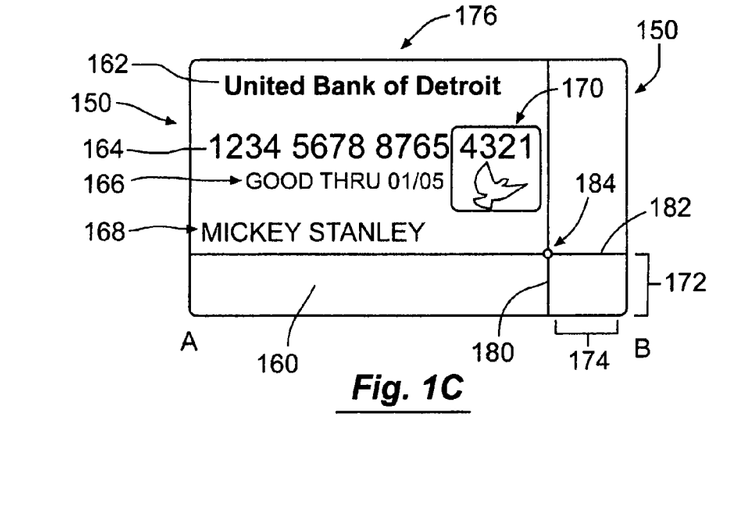
FIGS. 1C and 1D depict the front and back of a miniature card according to an embodiment of the present invention.
Figure 1D:
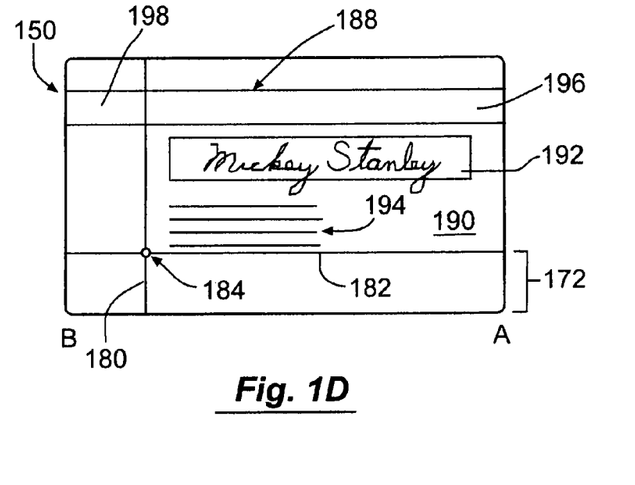

FIGS. 1C and 1D depict a presentation instrument 150 which may be processed through systems of the present invention. In one embodiment, presentation instrument 150 has outer dimensions similar to or the same as card 100 shown in FIGS. 1A and 1B. In other embodiments, presentation instrument 150 is a miniature card or mini card 150. In a particular embodiment, presentation instrument 150 has similar outer dimensions as card 100, but has a miniature card 176 formed thereon. Card 150 has a first or front surface 160 (FIG. 1C) and a second or back surface 190 (FIG. 1D). In a particular embodiment, front surface 160 includes similar information as contained on front surface 110 of card 100. For example, front surface 160 of card 150 may include a bank name 162, an account number 164, an expiration date 166, a customer name 168, and a holographic image 170, among other things. Second or back surface 190 may include a signature block 192, written or printed information 194, and a magnetic stripe 188.

In one embodiment, mini card 176 is formed from presentation instrument or card 150 by creating one or more scores through card 150. More specifically, in one embodiment a vertical or generally vertical score 180 is formed through card 150. This scoring may comprise a partial cutting or breaking of card 150 along a generally vertical line. Vertical score 180 helps define an edge of mini card 176, and creates a throwaway piece 174 of card 150. Similarly, a horizontal or generally horizontal score 182 is formed in card 150. Horizontal score 180 defines an edge of mini card 176, depicted as the bottom edge thereof, and creates a throwaway piece 172 of card 150. Throwaway pieces 172 and 174 share a common section in the bottom right corner of card 150 in the embodiment depicted in FIG. 1C.

As shown in FIGS. 1C and 1D, an intersection of scores 180, 182 may create a hole 184 in card 150. In other embodiments, the intersection of scores 180, 182 merely forms a deeper, wider, and/or larger score region, but does not form a hole through card 150. With reference to FIG. 1D, vertical score 180 passes through magnetic stripe 188. As a result, magstripe 188 has a first portion 198 and a second portion 196. Second portion 196 exists on the back of mini card 176, even after the throwaway pieces 172 and 174 are removed and discarded. The magnetic stripe first portion 198 is disposed on the back of throwaway piece 174. The passage of score line 180 through magnetic stripe 188 tends to cause error readings in systems processing card 150 which read magnetic stripe 188 using one or more read heads. More specifically, as card 150 passes the read heads, in one embodiment the read heads read first portion 198, then second portion 196. In between, score line 180 sometimes appears to the read heads as a separation between two cards, and not just a mark on a single card. The inventors of the present invention have devised systems and methods of use so that card readers are not fooled into believing card 150 is two cards when only a single card exists.

Figure 2A:
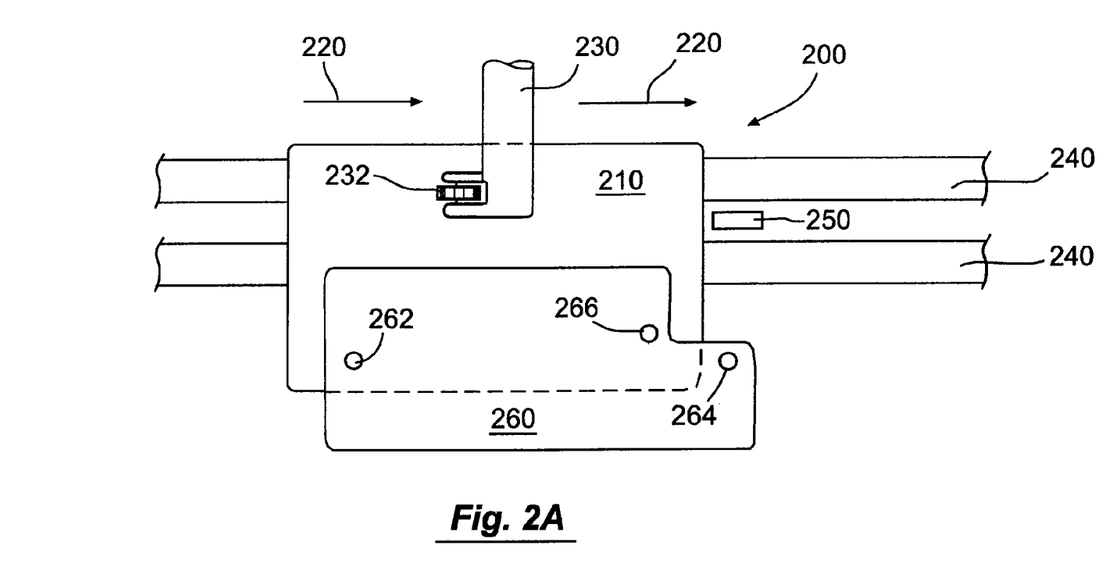
FIGS. 2A and 2B are simplified overall views of a portion of a card reader system according to an embodiment of the present invention.
Figure 2B:
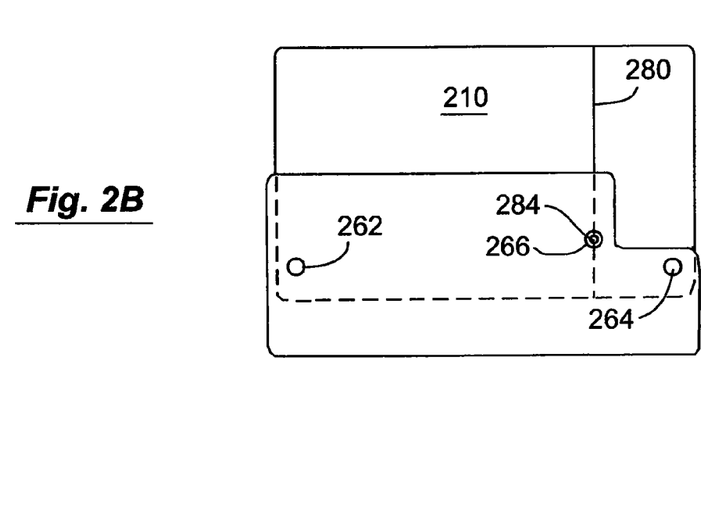

A portion of a card reader system 200 according to the present invention is depicted in FIGS. 2A and 2B. Card reader 200 includes one or more transfer devices that transfers a card 210 in the direction depicted by arrows 220. Card 210 may include cards 100 and/or cards 150. In one embodiment, system 200 includes a transfer arm 230 having a roller 232 attached. Roller 232 engages an exposed surface of card 210, causing the card to travel in the direction of arrows 220. In some embodiments, card 210 travels along a track 240, that may consist of rollers, belts, cables or the like. In one embodiment, track 240 also moves in the direction shown by arrows 220. In this manner, card 210 is pulled along by track 240.

In some embodiments, a card stop 250 is disposed and positioned to at least temporarily stop the movement of card 210. Card stop 250 may include a peg, post, pin, arm or the like which is moved into the path of card 210 to at least temporarily arrest movement of card 210. This may be useful, for example, to ensure a prior card traveling in the direction of arrows 220 has completely passed read heads (not shown in FIGS. 2A and 2B), before card 210 is allowed to proceed in the direction shown by arrows 220. FIG. 2A further depicts a sensing device 260 that is adapted to sense at least the presence of card 210, and more specifically in some embodiments, to provide input(s) to a circuit so that the circuit may determine the size of card 210. In one embodiment, sensing device 260 includes a first sensor 262, a second sensor 264, and a third sensor 266. As best shown in FIG. 2B, first and second sensors 262, 264 are disposed generally near a lower portion of card 210. When both sensors 262 and 264 are disposed over card 210, third sensor 266 is disposed over a specified location or region of card 210. More specifically, in one embodiment, third sensor 266 is disposed over a vertical score line 280 formed in card 210. In a particular embodiment, sensor 266 is disposed over a hole 284 in card 210. Again, hole 284 may comprise an intersection of vertical score line 280 and a horizontal score line similar to score line 182 depicted in FIGS. 1C–1D.

In one embodiment, first sensor 262 and second sensor 264 are used to detect the presence of card 210, and in a particular embodiment, sensors 262 and 264 are disposed near opposing edges of card 210 as best seen in FIG. 2B. In one embodiment, when both sensors are covered or when both sensors sense card 210, card 210 is positioned so that sensor 266 is aligned with hole 284 and/or score 280. In this manner, sensor 266 is used to determine if card 210 is a card 150 having a mini card 176 disposed therein, or whether card 210 is a card 100 without a mini card. In this manner, input received from sensors 262, 264, 266 may be used to determine whether card 210 is a first size or a second size.

In a particular embodiment, sensors 262, 264, 266 will all provide similar feedback to a circuit when card 210 is a standard CR80 card or card 100. When card 210 is or includes a miniature card, sensor 266 is aligned over score line 280 and/or hole 284 and sensor 266 provides a different amplitude feedback to the circuit. The circuit then determines that card 210 is a mini card, at least in part due to the input received from sensors 262, 264, 266. It will be appreciated by those skilled in the art that greater or fewer numbers of sensors may be used within the scope of the present invention. For example, a single sensor may be used to detect the card presence, and a second sensor may operate to detect the score or hole in the card. Alternatively, card stop 250 is positioned relative to a sensor so that when card 210 is stopped, the sensor is positioned to detect the score or other mark on card 210 indicating card 210 is or contains a miniature card. Further, the sensor may be adapted to look for marks or other indicators on card 210, other than or in addition to scored regions, to help determine if a mini card exists.

Figure 3:
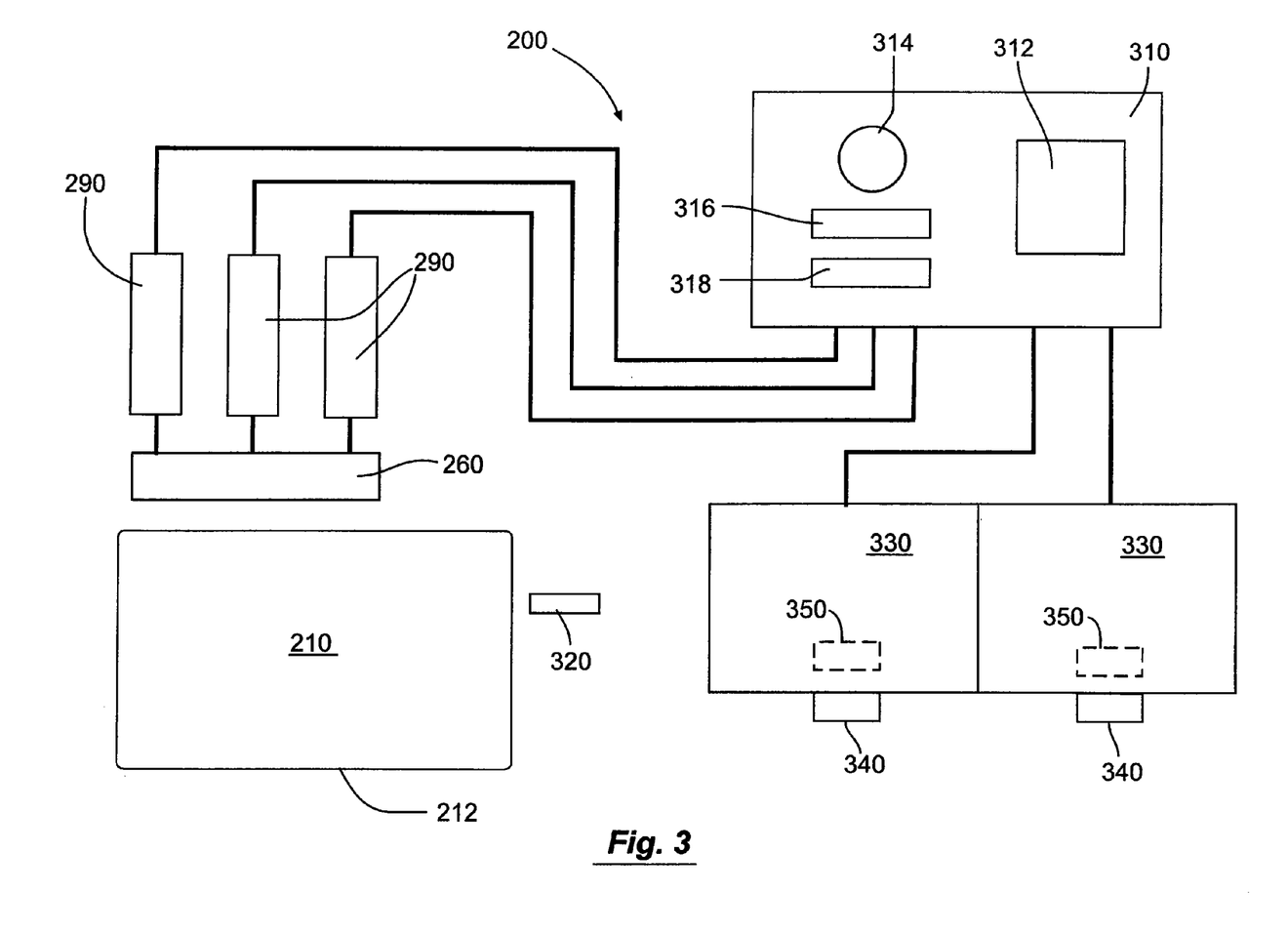
FIG. 3 depicts a portion of a card reader system according to an embodiment of the present invention.

FIG. 3 depicts an additional portion of system 200 according to an embodiment of the present invention. FIG. 3 again depicts card 210 and a sensor device 260. Sensor device 260 may comprise an array of sensors, including sensors 262, 264 and 266. Sensor device 260 may comprise a wide range of sensor types including optical sensors such as a fibre optic sensors. Other sensors also may be used within the scope of the present invention, including electronic sensors, mechanical sensors, and the like. Sensor device 260 is coupled to one or more sensor amplifiers 290 that are in turn coupled to a circuit board 310. Circuit board 310 includes or is coupled to a power source 314, and a processor 312. Processor 312 may comprise a microprocessor in some embodiments. In one embodiment, circuit 310 further includes first and second relays 316 and 318, whose function will be further described in conjunction with subsequent figures. In a particular embodiment, the number of relays correspond to the number of magstripe read heads contained in system 200. System 200 again may include a card stop 320 that is positioned to at least temporarily block the movement of card 210 from left to right in FIG. 3.

Circuit board 310 is further coupled to a switch mechanism 330. In one embodiment, switch mechanism 330 includes one or more read heads 350 and one or more switches 340. In a particular embodiment, each read head 350 has a corresponding switch 330 and may also have a corresponding relay. In the embodiment shown, two read heads 350, two switches 340, and two relays 316, 318 are used. In another embodiment, a single switch and read head are used. In alternative embodiments, more than two switches and read heads may be used. In one embodiment, read head(s) 350 read data from magnetic stripe 136 on card 100, and from magnetic stripe 188 on card 150. In a particular embodiment, read head(s) 350 read data from only second portion 196 of magnetic stripe 188 on card 150 when card 150 contains or comprises a mini card 176. This is accomplished by having read head 350 read the entire magstripe 136 when card 100 is detected by sensor device 260, and to read only a portion of magstripe 188 when card 150 is detected by sensors 260. In one embodiment, second portion 196 of magnetic stripe 188 is read and the read head does not read first portion 198.

Figure 4:
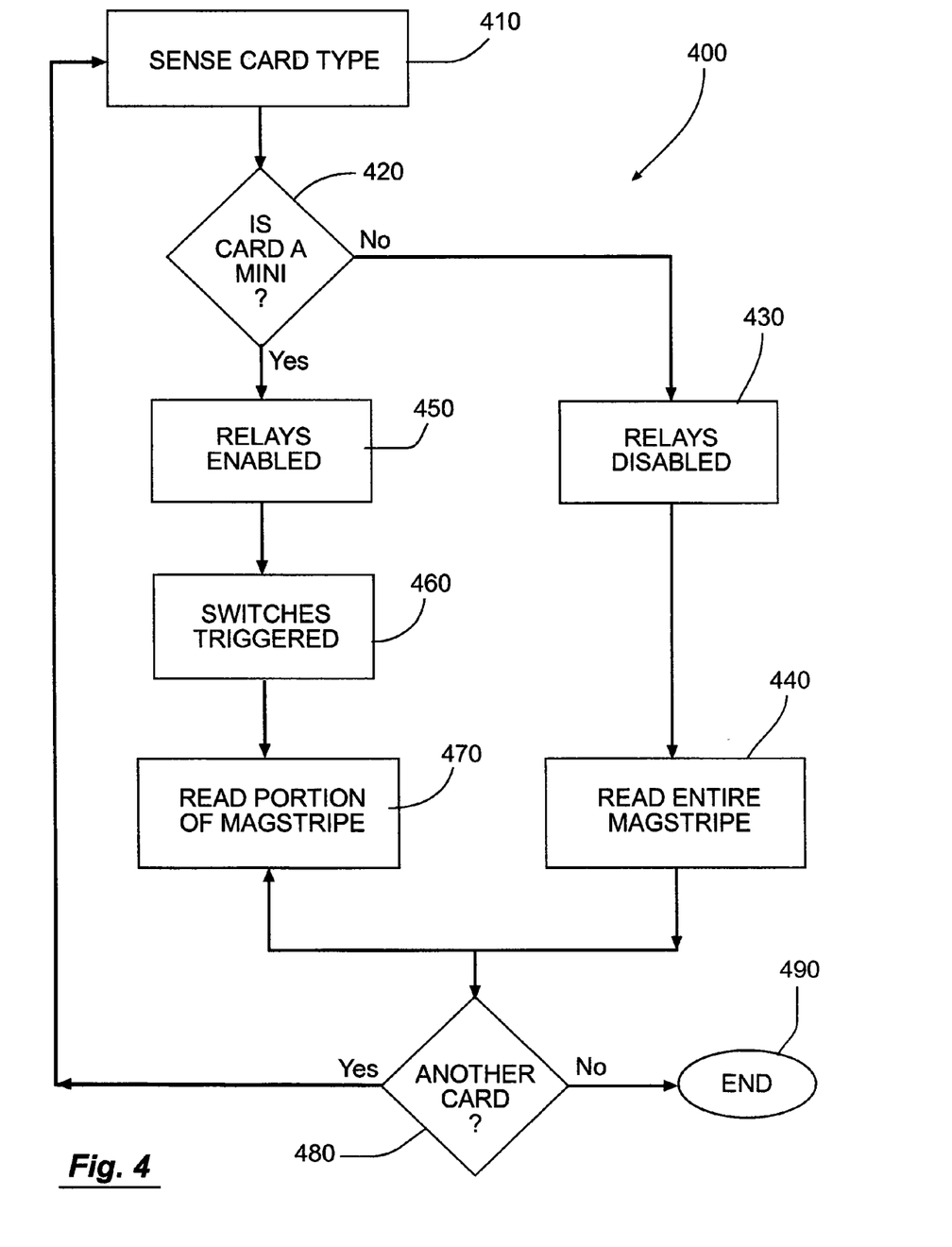
FIG. 4 depicts a simplified flow diagram of a method according to the present invention.

FIG. 4 depicts a method 100 of processing cards according to the present invention. In general, the method provides passing a card past the sensing device in order to sense a card type (Block 410). The sensing again may comprise sensing device 260, having optical sensors such as sensors 262, 264, 266 (depicted in FIGS. 2A–2B). Circuit 310 then uses input received from sensing device 260 to determine whether or not the card is a mini card (Decision 420). If the card is a standard size card, or a card similar to card 100, relays 316 and 318 are disabled. By disabling relays 316 and 318, read heads 350 are activated. In this manner, when the card passes by read heads 350, read heads 350 read the entire magnetic stripe on the back of the card. This may be desirable, for example, if the sensed card is the same as or similar to card 100 having magnetic stripe 136. In this manner, some embodiments of systems of the present invention operate to read the entire magnetic stripe for standard credit cards, debit cards, ATM cards, and the like.

If a miniature card is sensed (Decision Block 420), relays 316 and 318 are enabled (Block 450). By enabling relays 316 and 318, read heads 350 are disengaged. Read heads 350 then operate or reengage when switches 340 are triggered (Block 460). When switches 340 are triggered by card 210, a portion of the magstripe on the back of card 210 is read (Block 470). More specifically, when circuit 310 determines that card 210 comprises a mini card 150, and card 140 is either at card stop 320 and/or about to pass by read heads 350, circuit 310 disengages read heads 350 until card 210 is at a proper position relative to read heads 350. In one embodiment, switches 340 are positioned such that a leading edge 212 of card 210 engages switches 340. When leading edge 212 of card 210 engages switch 340, read head 350 is turned on and begins reading the magstripe on card 210. Switches 340 are positioned such that when they are contacted by leading edge 212 and cause read heads 350 to begin reading, read heads 350 are positioned above second portion 196 of magstripe 188. More specifically, first portion 198 of magstripe 188 has already passed read head 350, and as such is not read by read head 350. In this manner, data that may be contained on first portion 198 is not read. Further, read heads 350 are enabled after vertical score 180 has passed read head 350. As a result, score 180 does not create false reads by system 200. Card 210 then proceeds past the second read head 350, again engaging the corresponding switch 340 to enable read head 350 to read only a portion of the magnetic stripe on the back of card 210.

In some embodiments, only a single read from one of the read heads 350 is required to accurately read the magnetic stripe. The second read head 350 is effectively a back-up, to help ensure at least one of the two heads 350 successfully retrieves the data encoded in the magstripe. In this manner, system 200 helps reduce or prevent the likelihood that a false read will trigger a system shutdown.

Once card 210 has passed by read head(s) 350, a second card is then ready to pass by read heads 350 as part of a potentially long series of cards passing through system 200. If no other card is passing through system 200 (Decision 480), system 200 may disengage or stop processing (End 490). If another card is proceeding through system 200, sensing device 260 in conjunction with circuit 310 will again operate to sense the card type. In a particular embodiment, a series of sequential cards are the same type of cards, such as cards 100, cards 150, CR80 cards, or the like. In another embodiment, cards 100 and 150 are intermixed in an irregular pattern. In still another embodiment, cards 100 and cards 150 are mixed in a regular pattern, that may be an alternating pattern or the like. In this manner, system 200 enables read heads 350 to read second portion 196 of magnetic stripe 188, and then remain on to read the entire magnetic stripe 136 of the following card 100. The third card in this series will then be another card 150 that will cause read heads 350 to be temporarily disengaged until second portion 196 of magnetic stripe 188 on card 150 is properly positioned beneath read head 350 to trigger switch 340, causing read head 350 to read second portion 196. It will be appreciated by those skilled in the art that alternative card arrangements may pass through systems of the present invention, and/or be processed using methods of the present invention.

Figure 5:
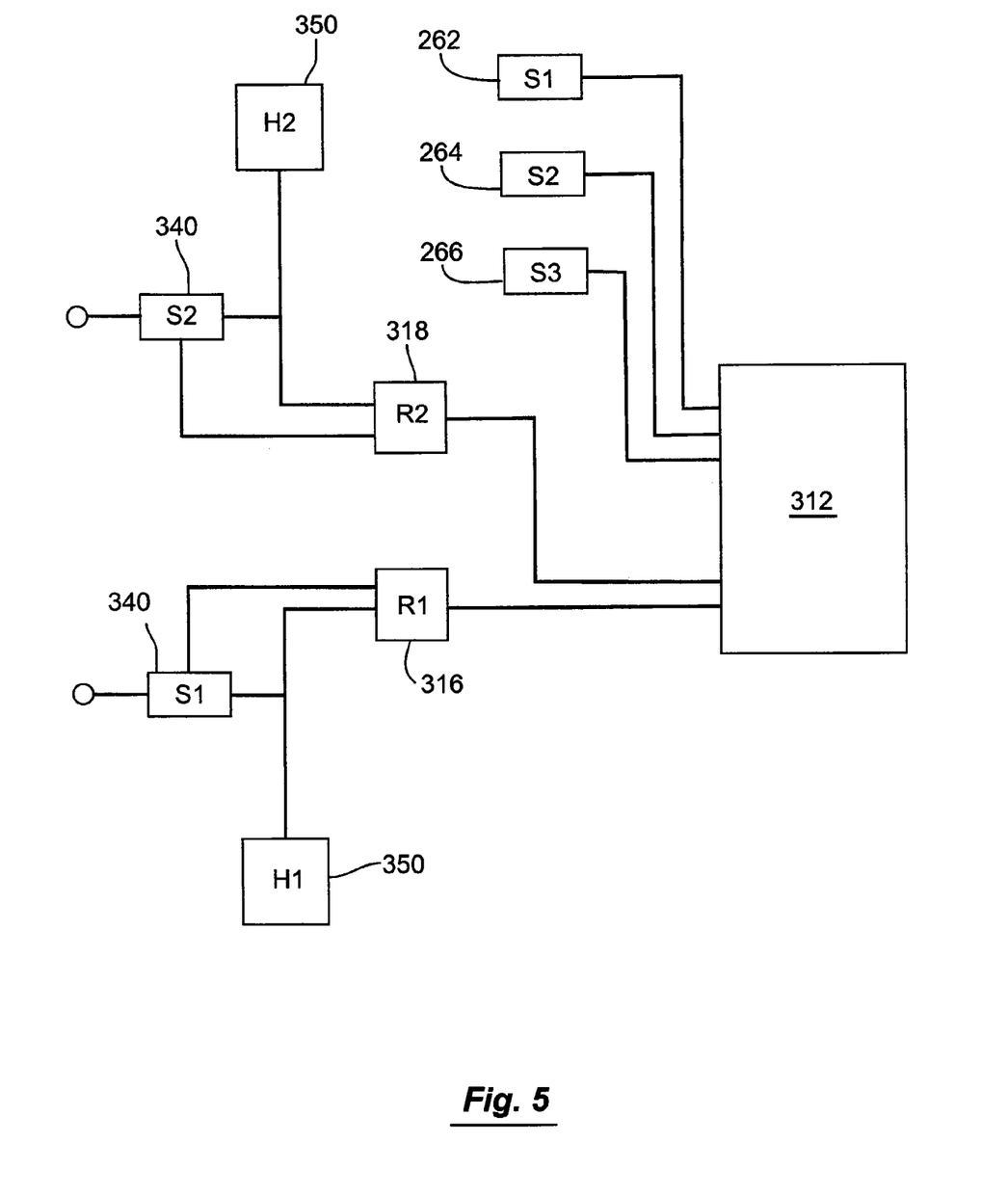
FIG. 5 is a simplified schematic of a circuit according to the present invention.

FIG. 5 depicts a simplified schematic of circuit device 310 according to an embodiment of the present invention. More specifically, FIG. 5 depicts a microcontroller or processor 312 coupled to sensors 262, 264, 266. Processor 312 is further coupled to relays 316 and 318 that are coupled in parallel to switches 340. Read heads 350 are coupled to processor 312 through switch 340 and/or relay 318. It will be appreciated by those skilled in the art that alternative layouts for circuit board 310 also exist within the scope of the present invention, and the above description is not intended to be limitative.

The invention has now been described in detail. However, it will be appreciated that the invention may be carried out in ways other than those illustrated in the aforesaid discussion, and that certain changes and modifications may be practiced within the scope of the appended claims. Accordingly, the scope of this invention is not intended to be limited by those specific examples, but rather is to be accorded in the scope represented in the following claims.

What is claimed is:

1. A card reader system, comprising:
   means for sensing the presence of a scoring of a card at a specified card location;
   a read head adapted to read a magstripe disposed on the card;
   a circuit coupled to the means for sensing and to the read head, the circuit adapted to:
   receive input from the means for sensing;
   determine whether the card is a first size or a second size based on the received input; and
   enable the read head to read the entire magstripe when the card is the first size, and to read a portion of the magstripe when the card is the second size.

2. The card reader system as in claim 1 wherein the card first size is a CR80 card.

3. The card reader system as in claim 1 wherein the card second size is smaller than a CR80 card.

4. The card reader system as in claim 1 wherein the card second size is a scored CR80 card.

5. The card reader system as in claim 1 further comprising a second read head, the circuit adapted to enable the second read head to read the entire magstripe when the card is the first size, and to read a portion of the magstripe when the card is the second size.

6. The card reader system as in claim 1 wherein the means for sensing comprises at least two optical sensors.

7. The card reader system as in claim 6 wherein at least one of the optical sensors is adapted to sense the scoring of the card.

8. The card reader system as in claim 1 wherein the scoring comprises a hole through the card at the specified card location.

9. The card reader system as in claim 1 further comprising a switch coupled to the read head, the switch adapted to turn on the read head when the card is the second size.

10. The card reader system as in claim 9 wherein the switch is positioned so that when engaged by the card of the second size, the read head reads the portion of the magstripe.

11. The card reader system as in claim 9 further comprising a relay adapted to disable the switch when the card is the first size.

12. A card reader system, comprising:
    a sensing device;
    a read head adapted to read a magnetic stripe disposed on a card;
    a circuit coupled to the sensing device and to the read head, the circuit adapted to:
    receive input from the sensing device;
    determine whether the card is a first type or a second type based on the received input; and
    enable the read head to read the entire magstripe when the card is the first type, and to read a portion of the magstripe when the card is the second type.

13. The card reader system as in claim 12 wherein the first type is a CR80 card and the second type is a scored CR80 card, the scored CR80 card having a mini-card disposed therein.

14. A method of processing a card, the method comprising:
   passing the card past a sensing device, the sensing device adapted to sense a scoring of the card if the card is scored at a specified location;
   determining a card size based at least in part on whether the scoring is sensed;
   passing the card past a read head;
   activating the read head for the entire passing of the card past the read head if the scoring is not sensed; and
   activating the read head for a portion of the passing of the card past the read head if the scoring is sensed.

15. The method as in claim 14 wherein the sensing device comprises at least first and second sensors, wherein the first sensor is adapted to detect the presence of a card and the second sensor is adapted to detect the scoring at the specified location.

16. The method as in claim 15 wherein the sensing device further comprises a third sensor adapted to detect the presence of the card.

17. The method as in claim 14 wherein activating the read head for the portion of the passing comprises engaging a switch with the card, the switch positioned relative to the read head so as to turn on the read head after a leading edge of the card has passed the read head.

18. The method as in claim 17 wherein activating the read head causes the read head to read a magnetic stripe on the card.

19. The method as in claim 17 further comprising disabling the switch when the scoring is not sensed by the sensing device.

20. The method as in claim 14 wherein the sensing device comprises at least one optical sensor.

21. The method as in claim 14 further comprising:
   passing the card past a second read head;
   activating the second read head for the entire passing of the card past the second read head if the scoring is not sensed; and
   activating the second read head for a portion of the passing of the card past the second read head if the scoring is sensed.

* * * * *